(12) United States Patent
Yanagi (10) Patent No.: US 7,486,880 B2
(45) Date of Patent: Feb. 3, 2009

(54) CAMERA DEVICE CAPABLE OF CHANGING RANGE-FINDING AREA

(75) Inventor: Kazunori Yanagi, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 391 days.

(21) Appl. No.: 11/274,500

(22) Filed: Nov. 15, 2005

(65) Prior Publication Data

US 2006/0104619 A1 May 18, 2006

(30) Foreign Application Priority Data

Nov. 17, 2004 (JP) ............................... 2004-332529

(51) Int. Cl.
  G03B 17/00 (2006.01)
  G03B 3/00 (2006.01)
  G03B 13/00 (2006.01)
(52) U.S. Cl. ......................... 396/53; 396/124; 348/352
(58) Field of Classification Search ............. 396/50–55, 396/70, 103, 139, 159, 124; 348/208.11, 348/208.14, 345, 347, 348, 352, 208.1–208.3
See application file for complete search history.

(56) References Cited

U.S. PATENT DOCUMENTS

| 5,187,585 A * | 2/1993 | Kaneda et al. ............... 348/347 |
| 5,341,169 A * | 8/1994 | Kaneda et al. ............... 348/352 |
| 6,285,831 B1 * | 9/2001 | Hara ........................... 396/50 |
| 2006/0066744 A1 * | 3/2006 | Stavely et al. ............... 348/352 |

* cited by examiner

Primary Examiner—W. B. Perkey
Assistant Examiner—Minh Phan
(74) Attorney, Agent, or Firm—Frishauf, Holtz, Goodman & Chick, P.C.

(57) ABSTRACT

A camera device includes a camera body having an optical system, an auto focus unit which adjusts a focus of the optical system to an object which exists in a predetermined range-finding area in an image formed by the optical system, a detector which detects a direction and a quantity of an angular acceleration of the camera body, and a control unit which changes a position of the range-finding area based on the direction and the quantity of the angular acceleration detected by the detector.

15 Claims, 6 Drawing Sheets

CAMERA DEVICE CAPABLE OF CHANGING RANGE-FINDING AREA

CROSS-REFERENCE TO RELATED APPLICATIONS

This application is based upon and claims the benefit of priority from prior Japanese Patent Application No. 2004-332529, filed Nov. 17, 2004, the entire contents of which are incorporated herein by reference.

BACKGROUND OF THE INVENTION

1. Field of the Invention

The present invention relates to a camera device including an auto focus function, and in particular, to a camera device capable of changing a range-finding area.

2. Description of the Related Art

Conventionally, it is generally known that a camera device such as a digital camera or a silver salt camera includes an auto focus (AF) function which employs a variety of systems. Further, there is proposed a camera device capable of changing a range-finding area in an AF function. Such a camera device includes a circuit which detects motion information of a camera body and a setting unit which sets an AF range-finding area based on the motion information detected by the circuit, wherein a quantity or a position of the range-finding area is changed in response to a motion quantity of the camera body.

Therefore, the AF range-finding area generally set at a center part of an imaging area changes its position in response to the motion quantity of the camera body.

BRIEF SUMMARY OF THE INVENTION

According to an embodiment of the present invention, a camera device comprises:

a camera body having an optical system;

an auto focus unit which adjusts a focus of the optical system to an object which exists in a predetermined range-finding area in an image formed by the optical system;

a detector which detects a direction and a quantity of an angular acceleration of the camera body; and a control unit which changes a position of the range-finding area based on the direction and the quantity of the angular acceleration detected by the detector.

According to another embodiment of the present invention, a camera device comprises:

a camera body having an optical system;

an auto focus unit which adjusts a focus of the optical system to an object which exists in a predetermined range-finding area in an image formed by the optical system;

a detector which detects an angular acceleration of the camera body; and a control unit which changes a position of the range-finding area based on a variation in the angular acceleration detected by the detector.

According to another embodiment of the present invention, a computer program product is configured to store program instructions for execution on a computer system in a camera device comprising a camera body having an optical system, an auto focus unit which adjusts a focus of the optical system to an object which exists in a predetermined range-finding area in an image formed by the optical system, and a detector which detects a direction and a quantity of an angular acceleration of the camera body, the computer program product enables the computer system to perform:

changing a position of the range-finding area based on the direction and the quantity of the angular acceleration detected by the detector.

According to another embodiment of the present invention, a computer program product is configured to store program instructions for execution on a computer system in a camera device comprising a camera body having an optical system, an auto focus unit which adjusts a focus of the optical system to an object which exists in a predetermined range-finding area in an image formed by the optical system, and a detector which detects an angular acceleration of the camera body, the computer program product enables the computer system to perform:

changing a position of the range-finding area based on a variation in the angular acceleration detected by the detector).

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which.

DETAILED DESCRIPTION OF THE INVENTION

An embodiment of a camera device according to the present invention will now be described with reference to the accompanying drawings.

First Embodiment

Figure 1:
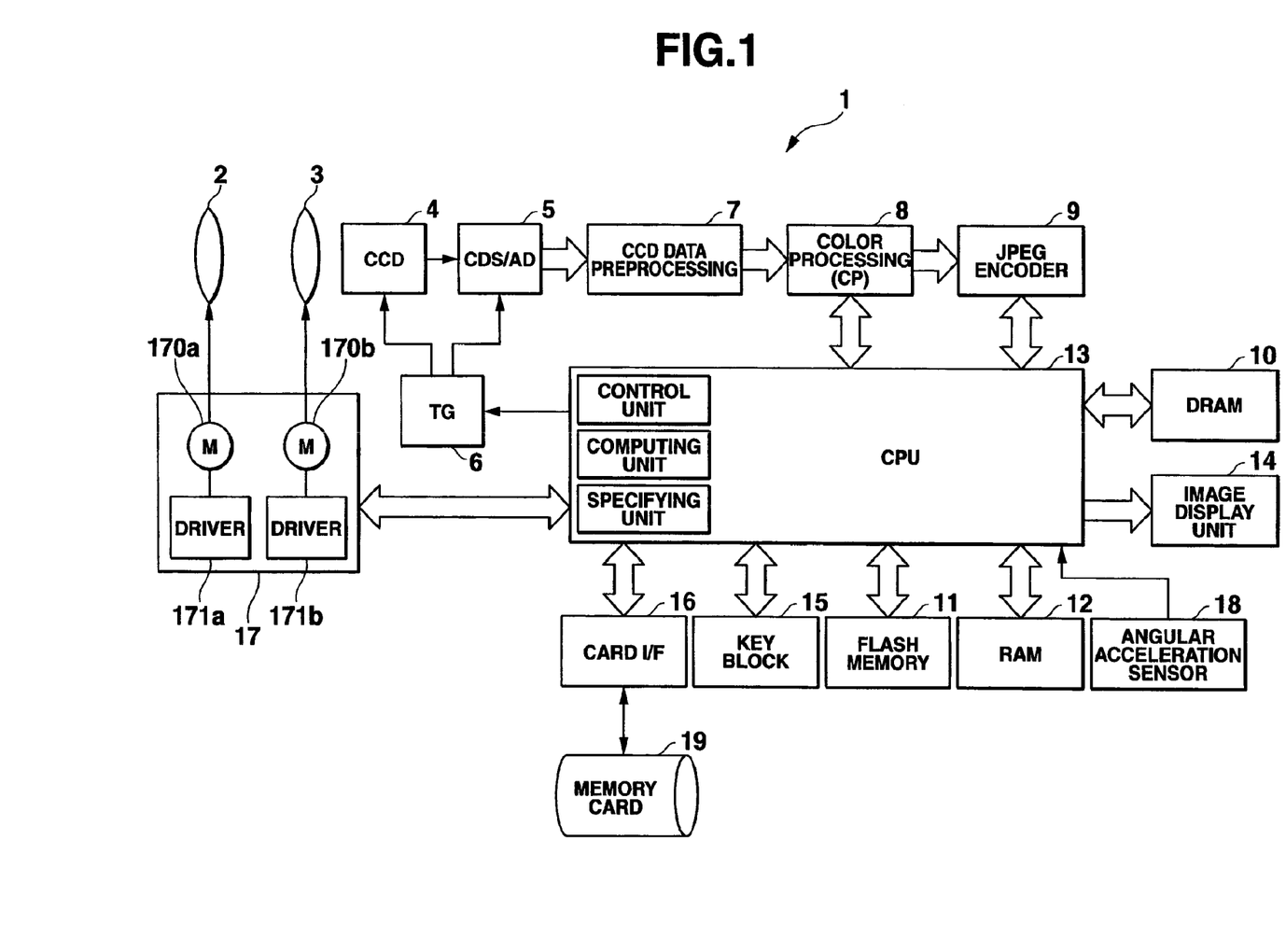
FIG. 1 is a block diagram depicting a digital camera according to an embodiment of the present invention.

FIG. 1 is a block diagram depicting a digital camera 1 which is common to the embodiments of the present invention. The digital camera 1 includes an AF function. This camera 1 includes a focus lens 2, a zoom lens 3, a CCD 4, a CDS (correlation double sampling)/AD (analog to digital conversion) block 5, a timing generator (TG) 6, a CCD data preprocessing block 7, a color processing (CP) block 8, a JPEG (joint photographic experts group) encoder 9, a DRAM 10, a built-in flash memory 11, a RAM 12, a CPU 13, an image display unit 14, a key block 15, a card interface 16, a motor drive block 17, and an angular acceleration sensor 18.

A memory 19 detachably mounted on a card slot of the camera body (not shown) is connected to the card interface 16.

The focus lens 2 and the zoom lens 3 each are composed of lens groups (not shown). The motor drive block 17 includes a focus motor 170a which drives the focus lens 2 in an optical axis direction, a zoom motor 170b which drives the zoom lens 3 in the optical axis direction, and motor drivers 171a and 171b which drive the focus motor 170a and the zoom motor 170b, respectively, in accordance with a control signal sent from the CPU 13.

The CCD 4 photoelectrically converts an object image projected on its light receiving surface via the focus lens 2 and the zoom lens 3, and outputs the converted image as an imaging signal. The TG 6 generates a timing signal having a predetermined frequency, and drives the CCD 4. The CDS/AD block 5 samples the output signal from the CCD 4, eliminates noise, and converts the noise eliminated output signal to a digital signal. The CCD data preprocessing block 7 carries out a data processing operation such as a brightness signal processing operation with respect to the imaging signal converted to the digital signal. The color processing (CP) block 8 carries out a color processing operation such as a color separating operation with respect to an image signal subjected to a brightness signal processing operation or the like, and generates Y, Cb, and Cr image data. The DRAM 10 sequentially stores image data on Y, Cb, and Cr after color processed.

The image display unit 14 includes a color LCD, a drive circuit which drives the color LCD, and the like. In an imaging standby state in which a shutter key is not pressed while an imaging mode is set, this image display unit 14 displays a through image based on image data for one frame (screen) output from the CCD 4 and stored in the DRAM 10. In a state in which a reproducing mode is set, the display unit 14 displays a recorded image based on the image data read out and expanded from the memory card 19.

The JPEG encoder 9 JPEG-compresses image data output from the color processing (CP) block 8 during an image recording operation. The memory card 19 records image data after compressed, the image data being sent via the card interface 16. The recorded image data is read out during an operation of reproducing the recorded image, the read out image data is expanded by means of the JPEG encoder 9, and the expanded image data is displayed at the image display unit 14. The key block 15 includes a variety of operation keys such as toggle keys used for toggling an operation between the imaging mode and the reproducing mode; a shutter key; a set key for setting an aperture or a shutter speed; and a zoom key used for changing a zoom magnification, and sends an operation signal according to a key operation to the CPU 13. The shutter key includes a so-called half-shutter function, and is configured to enable a half-push operation for imaging notice and a full-push operation for instructing imaging.

The flash memory 11 stores programs and a variety of data required for control of the digital camera 1 by means of the CPU 13, i.e., AF control, AE (auto exposure) control, AWB (auto white balance) control and the like. The CPU 13 operates the RAM 12 as a work memory in accordance with an operation signal from the key block 15 and a program, whereby the CPU 13 functions as a control unit or a computing unit in the present invention.

The angular acceleration sensor 18 detects an angular acceleration of the camera body in the digital camera 1 and supplies the detected angular acceleration to the CPU 13. AF control is realized as a contrast detecting system which detects an AF evaluation quantity (contrast quantity) in an AF area 20 (refer to FIG. 4) of an image acquired at each position and defines a peak position of the AF evaluation quantity as a focus position while moving the focus lens 2 in an optical axis direction.

Figure 2:
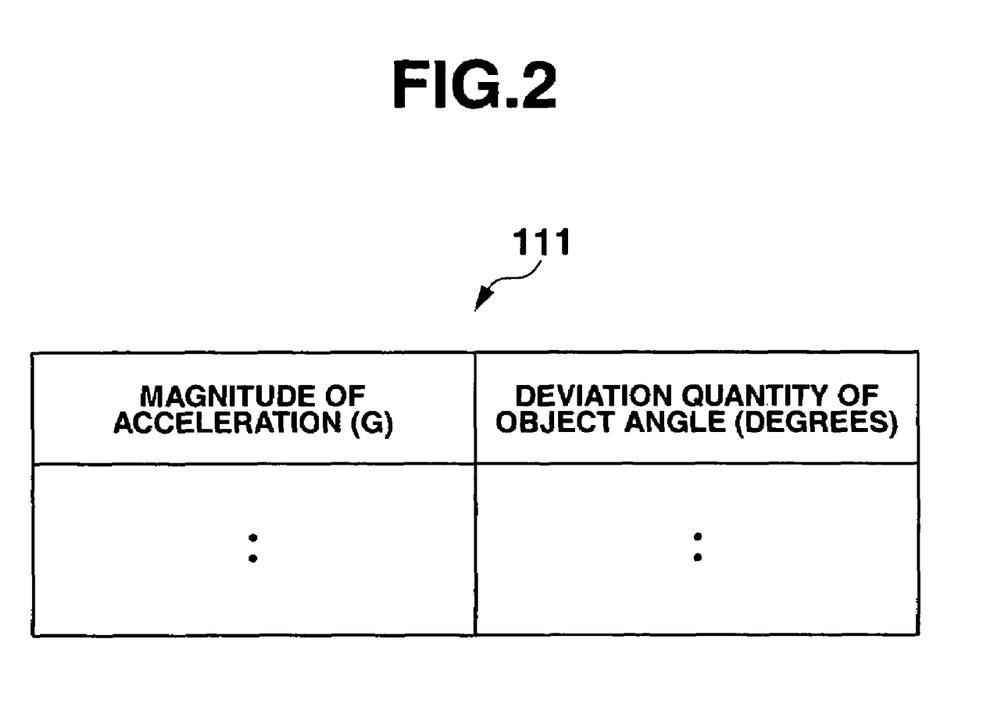
FIG. 2 is a schematic view showing an angular acceleration to deviation angle corresponding table.
Figure 3:
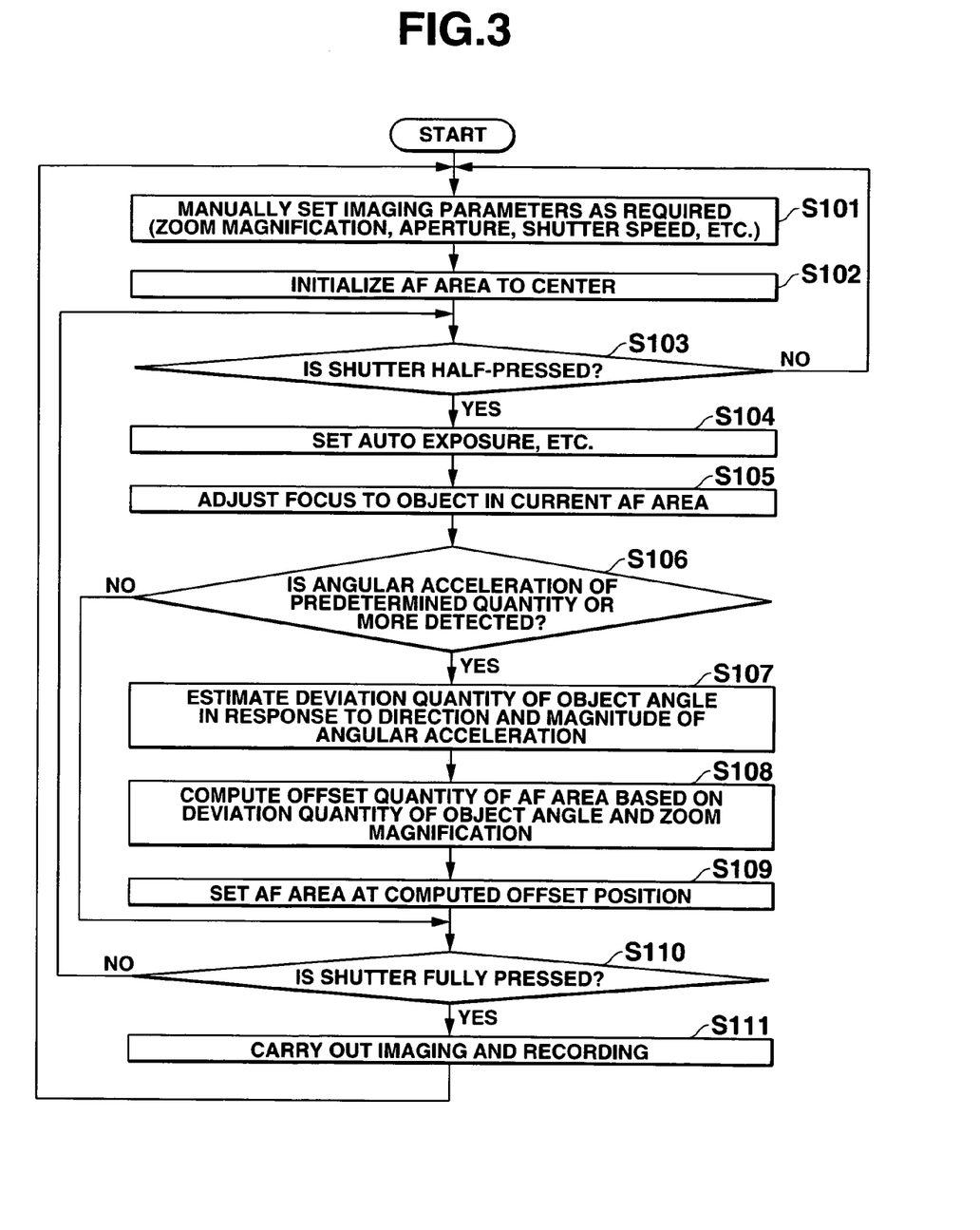
FIG. 3 is a flow chart showing the contents of processing operations executed by a CPU in a recording mode according to a first embodiment.

The flash memory 11 stores programs and a variety of data and stores an angular acceleration to deviation angle corresponding table 111 shown in FIG. 2. The deviation angle is defined by a moving angle of the object with reference to the camera. The angular acceleration to deviation angle corresponding table 111 stores a deviation quantity of an object angle in association with a quantity of the angular acceleration detected by the angular acceleration sensor 18. When the camera is moved, the angle (deviation angle) of the object varies. The deviation angle can be estimated from the initial angular acceleration based on an experience. The table 111 shown in FIG. 2 is prepared based on the above estimated value. However, the table 111 may be created by learning a deviation angle with respect to the initial angular acceleration. Now, a description will be given with respect to an operation of the digital camera including the above constituent elements according to the present invention. FIG. 3 is a flow chart showing the contents of processing operations executed by the CPU 13 in the recording mode. That is, when the recording mode is set, the CPU 13 starts a processing operation in accordance with a program and manually sets a zoom magnification, an aperture, and a shutter speed as required on the basis of an operating signal from the key block 15 (step S101). A display position of the AF area 20 is initialized so that the AF area 20 becomes a center of an object image displayed at the image display unit 14 (step S102). In accordance with the processing operation in step S102, as shown in a frame F1 shown in FIG. 4, the AF area 20 is set at its center part in the image display unit 14.

It is determined whether or not a shutter key is half-pressed (step S103). When the determination result is affirmative, a processing operation required for imaging such as auto exposure setting is executed (step S104). The focus motor 170a is controlled, whereby the focus lens 2 is driven in an optical axis direction, and a focus is adjusted to an object of the current AF area 20 (step S105). It is determined whether or not a predetermined angular acceleration or more is detected based on an output from the angular acceleration sensor 18 (step S106). In the case where the determination result is negative, processing goes to step S110 without executing the processing operations in steps S107 to S109. In step S110, it is determined whether or not the shutter key is fully pressed, and the processing operations in step S103 and the subsequent are repeated until the shutter key is fully pressed.

As a result of the determination in step S106, when a predetermined angular acceleration or more is detected, a specifying unit of the CPU 13 specifies a deviation quantity of an object angle estimated in association with the quantity of the angular acceleration (step S107). That is, the deviation quantity of the object angle which corresponds to the angular acceleration detected by the angular acceleration sensor 18 is read out from the angular acceleration to deviation angle corresponding table 111. An offset quantity (displacement quantity) of the AF area 20 is computed based on this read out deviation quantity of the object angle and a zoom magnification set at a current time point (step S108). The offset quantity of this AF area is obtained by using the formula below:

Offset quantity of AF area=(deviation quantity of object angle/picture angle (zoom magnification))×K where K is a constant.

Further, the AF area 20 is set at an offset position having the computed offset quantity and a direction detected by the angular acceleration sensor 18 (step S109). Therefore, by the processing operation in this step S109, the AF evaluation quantity (contrast quantity) in the AF area 20 set at the offset position is detected, and AF control is made such that the peak position of the AF evaluation quantity is defined as a focus position.

In step S110 that follows step S109 or step S106, it is determined whether or not the shutter is fully pressed. When the determination result is affirmative (YES in step S110), an imaging processing operation is carried out, the acquired image is encoded, and the encoded image is recorded as image data in the memory card 19 (step S111).

Figure 4:
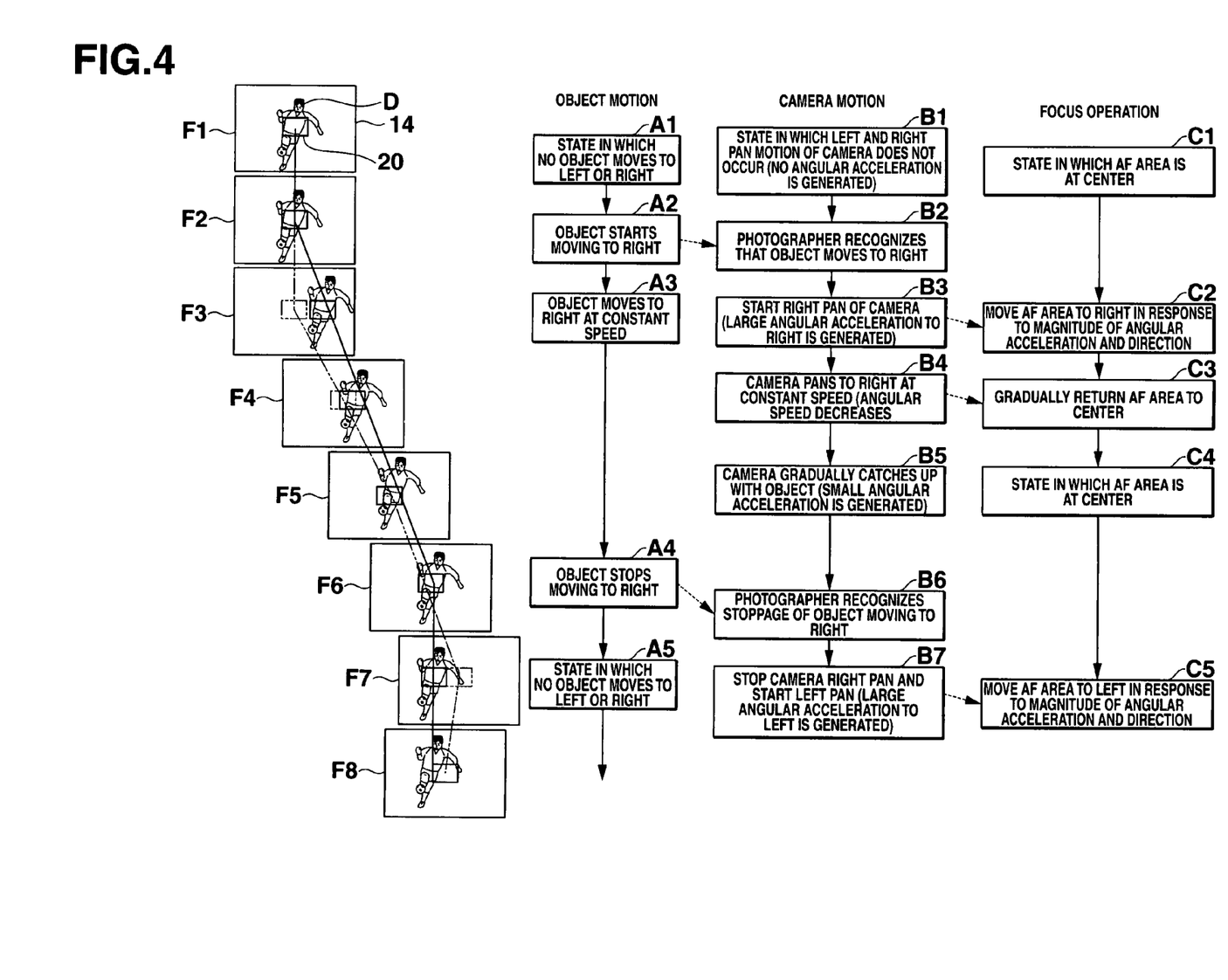
FIG. 4 is an explanatory view showing a relationship between an object motion, a camera motion and a focus motion.

FIG. 4 is a view showing a relationship between a move operation (focus operation) in the AF area 20 of the digital camera 1, an object motion, and a user's camera operation in accordance with the embodiment. That is, in a state in which an object O does not move horizontally (step A1), no pan operation to the left and right of the camera body is made, and a state in which no acceleration is generated is established (step B1). At this time, by the processing operation in step S102, the AF area 20 is set at the center of the image display unit 14, as indicated by the frame F1 (step C1).

When the object O, from this state, starts moving toward the right (step A2), a photographer recognizes the movement of the object O toward the right (step B2). When the object O moves toward the right at a certain speed (step A3), the photographer starts a pan operation to the right of the camera, whereby a large angular acceleration in the right direction is generated in the camera body (step B3). Then, the angular acceleration sensor 18 detects this acceleration and moves the AF area 20 in association with the quantity and direction of the angular acceleration, as indicated by a frame F3, by the processing operations in steps S106 to S109. Then, the photographer pans the camera to the right at a certain speed, whereby the angular acceleration decreases (step B4), and concurrently, the AF area 20 is gradually returned to the center, as indicated by a frame F4 (step C3). When the angular acceleration sensor 18 gradually catches up with the object O, the generated angular acceleration is reduced (step B5). Thus, as indicated by a frame F5, the AF area 20 is set at the center position (step C4).

After the object O has stopped its movement toward the right (step A4), it is assumed that a current state moves to a state in which no movement toward the left or right occurs (step A5). Then, although the photographer recognizes that movement toward the right of the object O has stopped (step B6), a pan cannot be stopped instantly, and a right pan is stopped with a slight delay (step B7). Therefore, as indicated by a frame F7, the object O shifts to the right side of the image display unit 14. Thus, the photographer starts a left pan after stopping the right pan, whereby a large angular acceleration to the left is generated in the camera body (step B7). Then, the angular acceleration sensor 18 detects this acceleration, and moves the AF area 20 to the left in association with the quantity and direction of the angular acceleration (step C5). In this manner, as indicated by a frame F8, the AF area 20 is positioned on the object O.

According to the present embodiment, a range-finding area is displaced depending on a direction and a quantity of an angular acceleration detected, whereby, even if an object whose motion is hardly predicted has suddenly started moving, the range-finding area tracks the motion of the object, and therefore changes its position.

While the present embodiment describes that the deviation quantity of an object angle is stored in advance in association with the quantity of the angular acceleration detected by the angular acceleration sensor 18 in the angular acceleration to deviation angle corresponding table 111, it may be configured such that a user sets an arbitrary quantity in the angular acceleration to deviation angle corresponding table 111 by a key operation in the key block 15. Further, it is not necessary to obtain the deviation quantity of object angle from the angular acceleration. The offset quantity may be calculated directly from the angular acceleration based on the following relationship.

Offset quantity of AF area=(angular acceleration/picture angle (zoom magnification))×L where L is a constant.

Second Embodiment

The second embodiment of the camera device according to the present invention will be described. The same portions as those of the first embodiment will be indicated in the same reference numerals and their detailed description will be omitted.

Figure 5:
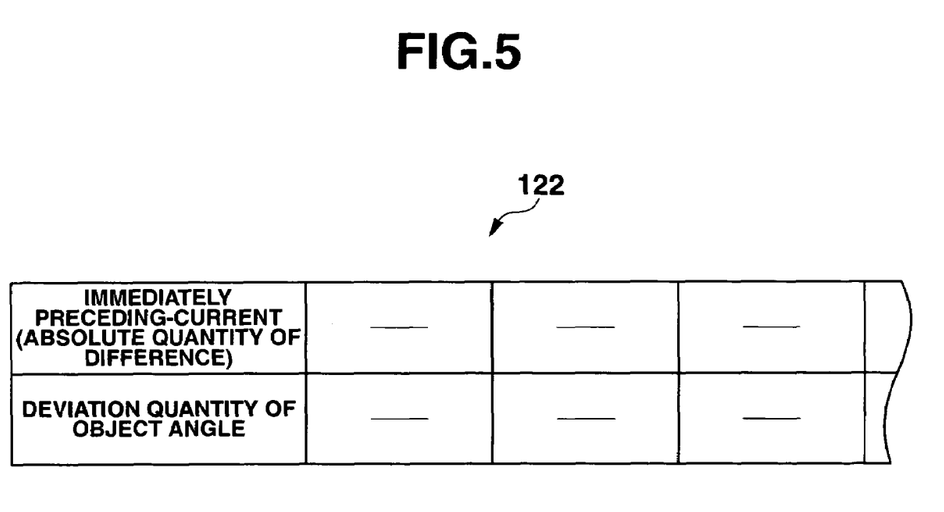
FIG. 5 is a schematic view showing an angular acceleration difference to deviation quantity corresponding table.

In a second embodiment of the present invention, the flash memory 11 stores an angular acceleration difference to deviation quantity corresponding table 122 shown in FIG. 5. The angular acceleration difference to deviation quantity corresponding table 112 stores a deviation quantity of an object angle in association with an absolute quantity in difference between an immediately preceding angular acceleration detected by an angular acceleration sensor 18 and a current angular acceleration.

Figure 6:
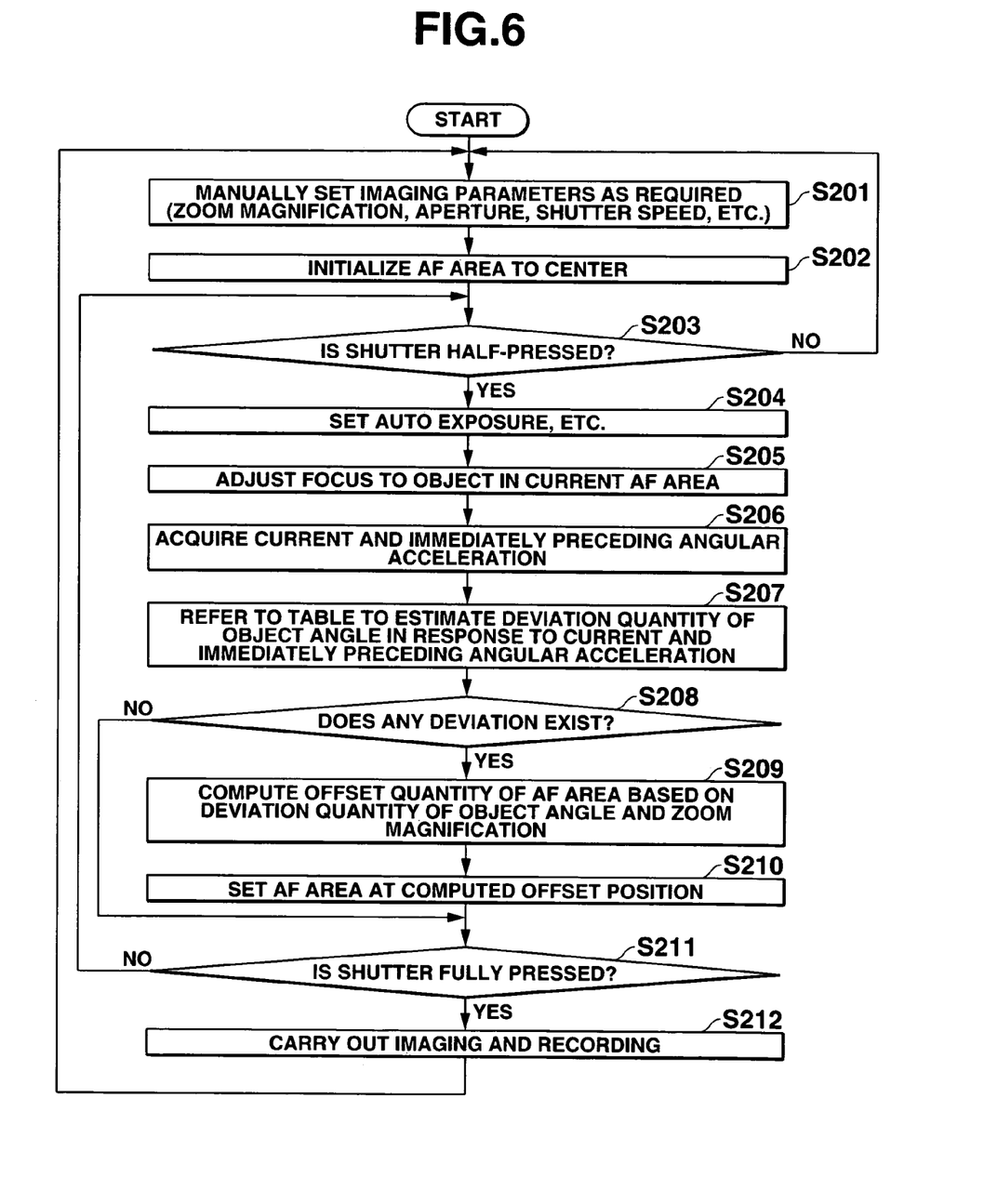
FIG. 6 is a flow chart showing the contents of processing operations executed by a CPU in a recording mode according to a second embodiment.

FIG. 6 is a flow chart showing the contents of processing operations executed by the CPU 13 in a recording mode according to the second embodiment. That is, in this flow chart, the processing operations in steps S201 to S205 are identical to those in steps S101 to S105 in the flow chart shown in FIG. 3 which is described above. In step S206 that follows step S205, the current and immediately preceding accelerations are acquired. Namely, every time an angular acceleration is detected by the angular acceleration sensor 18, the CPU 13 stores the detected angular acceleration in the RAM 12. When the angular acceleration sensor 18 detects an angular acceleration, the current angular acceleration is acquired from the angular acceleration sensor 18 and the immediately preceding angular acceleration is acquired from the RAM 12.

A deviation quantity of an object angle in accordance with the current and immediately preceding angular accelerations is estimated with reference to the angular acceleration difference to deviation quantity corresponding table 112 (step S207). That is, a deviation quantity of an object angle which corresponds to an absolute quantity in difference between the immediately preceding angular acceleration and the current angular acceleration is read out from the angular acceleration difference to deviation quantity corresponding table 112. It is determined whether or not the deviation quantity of an object angle exists (step S208). In the case where the determination result is negative, processing goes to step.S211 without executing the processing operations in steps S209 and S210. In step S211, it is determined whether or not the shutter key is fully pressed, and the processing operations from step S203 and the subsequent are repeated until the shutter key is fully pressed.

As a result of the determination in step S208, when the deviation quantity of an object angle exists, an offset quantity (displacement quantity) of the AF area 20 is computed based on the deviation quantity of the object angle read out in step S207 and a zoom magnification set at a current time point (step S209). As in the first embodiment, the offset quantity of this AF area is obtained by the formula below:

Offset quantity of AF area=(deviation quantity of object angle/picture angle (zoom magnification))×K wherein K is a constant.

Further, the AF area 20 is set at an offset position having the computed offset quantity and a direction detected by the angular acceleration sensor 18 (step S210). Therefore, the AF evaluation quantity (contrast quantity) in the AF area 20 set at the offset position by the processing operation in this step S210 is detected, and AF control is made such that the peak position of the AF evaluation quantity is defined as a focus position.

In step S211 that follows step S210 or step S208, it is determined whether or not the shutter is fully pressed. When the determination result is affirmative (YES in step S211), an imaging processing operation is carried out, the acquired image is encoded, and the encoded image is recorded as image data in the memory card 19 (step S212).

While the present embodiment describes that the deviation quantity of the object angle is stored in advance in association with the quantity of the angular acceleration detected by the angular acceleration sensor 18 in the angular acceleration to deviation angle corresponding table 112, it may be configured such that a user sets an arbitrary quantity in the angular acceleration to deviation angle corresponding table 112 by a key operation in the key block 15.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as predetermined means, allowing the computer to realize a predetermined function, or allowing the computer to conduct predetermined means.

What is claimed is:

1. A camera device comprising:
   a camera body having an optical system;
   an auto focus unit which adjusts a focus of the optical system to an object which exists in a predetermined range-finding area in an image formed by the optical system;
   a detector which detects an angular acceleration of the camera body and a direction of the angular acceleration; and
   a control unit which moves a position of the range-finding area in a substantially same direction as the direction of the angular acceleration detected by the detector.

2. A camera device according to claim 1, wherein the control unit moves the position of the range-finding area when the angular acceleration detected by the detector is equal to or greater than a predetermined quantity.

3. A camera device according to claim 1, further comprising:
   a computing unit which computes a displacement direction and a displacement quantity in the range-finding area, based on the direction and a quantity of the angular acceleration detected by the detector, and
   wherein the control unit moves the position of the range-finding area in accordance with the displacement direction and the displacement quantity computed by the computing unit.

4. A camera device according to claim 3, further comprising:
   a zoom unit which variably sets a zoom magnification of the optical system; and
   a specifying unit which specifies a deviation angle of the object in response to the angular acceleration detected by the detector,
   wherein the computing unit computes the displacement direction and the displacement quantity in the range-finding area based on the deviation angle specified by the specifying unit and the zoom magnification set by the zoom unit.

5. A camera device according to claim 4, further comprising:
   a memory which stores angular acceleration values and deviation angle values which are associated with each other,
   wherein the specifying unit specifies the deviation angle of the object in response to the angular acceleration detected by the detector with reference to the angular acceleration values and the deviation angle values stored in the memory.

6. A camera device according to claim 5, wherein the angular acceleration values and the deviation angle values stored in the memory are arbitrarily set.

7. A camera device comprising:
   a camera body having an optical system;:
   an auto focus unit which adjusts a focus of the optical system to an object which exists in a predetermined range-finding area in an image formed by the optical system;:
   a detector which detects a current angular acceleration of the camera body; and
   a control unit which changes a position of the range-finding area based on the current angular acceleration detected by the detector and an angular acceleration detected immediately before the detection of the current angular acceleration.

8. A camera device according to claim 7, further comprising:
   a computing unit which computes a displacement direction and a displacement quantity of the range-finding area based on the current angular acceleration detected by the detector and the angular acceleration detected immediately before the detection of the current angular acceleration, and
   wherein the control unit changes the position of the range-finding area in accordance with the displacement direction and the displacement quantity computed by the computing unit.

9. A camera device according to claim 8, further comprising:
   a zoom unit which variably sets a zoom magnification of the optical system; and
   a specifying unit which specifies a deviation angle of the object in response to the current angular acceleration detected by the detector and the angular acceleration detected immediately before the detection of the current angular acceleration, and wherein the computing unit computes the displacement direction and the displacement quantity in the range-finding area based on the deviation angle specified by the specifying unit and the zoom magnification set by the zoom unit.

10. A camera device according to claim 9, further comprising:
a memory which stores deviation angle values in association with values of differences between angular acceleration values,
wherein the specifying unit specifies the deviation angle of the object with reference to (i) a difference between the current angular acceleration detected by the detector and the angular acceleration detected immediately before the detection of the current angular acceleration, and (ii) the deviation angle values and the values of differences between angular acceleration values stored in the memory.

11. A camera device according to claim 10, wherein the values of differences between angular acceleration values and the deviation angle values stored in the memory are arbitrarily set.

12. A computer readable medium having stored thereon a program for controlling a camera device comprising a camera body having an optical system, an auto focus unit which adjusts a focus of the optical system to an object which exists in a predetermined range-finding area in an image formed by the optical system, and a detector which detects an angular acceleration of the camera body, said program controlling the camera device to perform functions comprising:
detecting the direction of the angular acceleration of the camera body; and
moving a position of the range-finding area in a substantially same direction as the detected direction.

13. A computer readable medium having stored thereon a program for controlling a camera device comprising a camera body having an optical system, an auto focus unit which adjusts a focus of the optical system to an object which exists in a predetermined range-finding area in an image formed by the optical system, and a detector which detects a current angular acceleration of the camera body, said program controlling the camera device to perform functions comprising:
changing a position of the range-finding area based on the current angular acceleration detected by the detector and an angular acceleration detected immediately before the detection of the current angular acceleration.

14. The camera apparatus according to claim 1, wherein the control unit moves the position of the range finding area based on a quantity of the angular acceleration.

15. The computer readable medium according to claim 12, wherein the position of the range finding area is moved based on a quantity of the angular acceleration.

* * * * *